TRANSVERSAL ELECTRIC WAVE FILTER

Filed Feb. 27, 1947 3 Sheets-Sheet 1

INVENTOR
L.C. PETERSON
BY
N. S. Ewing
ATTORNEY

INVENTOR
L. C. PETERSON
BY
N. S. Ewing
ATTORNEY

INVENTOR
L. C. PETERSON
BY N. S. Ewing
ATTORNEY

Patented Feb. 24, 1953 2,629,841

UNITED STATES PATENT OFFICE 2,629,841

TRANSVERSAL ELECTRIC WAVE FILTER

Liss C. Peterson, Chatham, N. J., assignor to Bell Telephone Laboratories, Incorporated, New York, N. Y., a corporation of New York Application February 27, 1947, Serial No. 731,231

10 Claims. (Cl. 315—39)

This invention relates to the modification of time-varying functions in accordance with preselected patterns; more particularly, it relates to electrical transducers of the types which are known in the art as transversal filters.

The behavior of electrical networks can be specified in two ways representing two different physical points of view. Ordinarily, one thinks first of the well known steady state point of view which describes the network performance in terms of the concepts of amplitude and phase response versus frequency. In addition to this more conventional viewpoint there is the time function one in which the network is described in terms of its amplitude-time response at the receiving end resulting from the application of an impulse of infinitesimal duration at the sending end. Network response may thus be considered either in terms of frequency or time functions. The bridge between these two avenues of approach is the Fourier Integral which may be thought of as a mathematical device for expressing a time function in terms of steady state phenomena.

For the most part prior art practice has been to base the design of communication networks upon the steady state frequency amplitude characteristics and an elaborate theory has been worked out for such design procedures. The networks thus obtained contain as elements, resistances, inductances and capacitances, the frequency and/or phase selective effects of which are used in various combinations to secure desired response characteristics.

On the other hand when network design is considered from the time function point of view, that is, when time rather than frequency is taken as the independent variable, one is led to a broad group of selective circuits whose principle of operation does not depend upon resonant combinations of network elements.

Thus, selective circuits embodying the time function concept have been disclosed in Patents 2,024,900, December 17, 1935, 2,124,599, July 26, 1938, and 2,128,257, August 30, 1938, to N. Wiener and Y. Lee and elsewhere in the art.

It is the principal object of this invention to provide certain improvements in the art of modifying given functions of time in accordance with desired patterns of amplitude, frequency, and phase variation.

A more specific object of this invention is to provide simplified techniques and apparatus for modifying an impressed electrical input in accordance with a preselected admittance function.

A certain class of devices, known in the art as transversal filters, substitute the time function approach for the conventional steady state approach in the simulation of network response, operating through a series of steps which include the following:

(1) Recording or storing the input signal;

(2) Weighting the stored record in accordance with a predetermined multiplying function; and (3) Integrating the weighted increments of record to produce a modified output.

The present invention relates to a transversal filter which in certain specific embodiments comprises an electron space discharge device in which progressive portions of the impressed signal are stored by the input electrodes in the form of electromagnetic waves and in which the stored record is progressively weighted in accordance with a chosen multiplying function by virtue of space variations in the transconductance between the input and output electrodes of the device. Each of the embodiments disclosed includes a cathode and a grid which respectively comprise coaxial outer and inner hollow semicylinders disposed about a central output electrode of small dimension.

In accordance with one of the disclosed embodiments, the pitch of the grid is space varied in accordance with the chosen multiplying function.

In accordance with a second embodiment disclosed, the desired variation in the transconductance is brought about by variations in the spacing between the grid and the cathode. In a modified form of this embodiment, a second shielding grid is interposed between the first grid and the collecting electrode.

In still another embodiment, successive grid wires are maintained at different potentials in accordance with the chosen multiplying function.

Other objects and features of the present invention will be apparent from a study of the detailed description hereinafter and the attached drawings, of which:

Figs. 1*a* to 1*e* are a series of diagrams illustrating the theory of operation of transversal filters;

Figs. 2*a* and 2*b* show graphical interpretations of two specific filter characteristics;

Fig. 3*a* shows a perspective view of a device in accordance with the present invention in which the pitch of the grid is space varied in accordance with a chosen multiplying function;

Fig. 3*b* is a schematic view of the system shown in perspective in Fig. 3*a*;

In the specification and claims hereinafter the transconductance between two electrodes will be interpreted to mean the change of current in the second of said electrodes brought about by a change in voltage applied to the first of said electrodes.

A concept which may be helpful in interpreting the specification and claims hereinafter is that of the transfer indicial admittance of a system. This quantity is defined by J. R. Carson in Electric Circuit Theory and the Operational Calculus, McGraw-Hill, 1926, page 14, as the ratio of the output current of the system, expressed as a time function, to the magnitude of the steady electromotive force suddenly inserted at the input of the system at time $t=0$.

The time-rate-of-change of the transfer indicial admittance defined above is a function of time designated $g(t)$. The function $g(t)$ is variously referred to in the specification and claims hereinafter as the "impulse response" or merely the "$g$-function" of a system.

Further discussion and definition of certain mathematical concepts, such as that of the "unit impulse," which will be relied on in the detailed description hereinafter will be found in volume I of Transients in Linear Systems by Gardner and Barnes, John Wiley and Sons, 1942, pages 255–263.

Figure 1A:
Figure 1B:
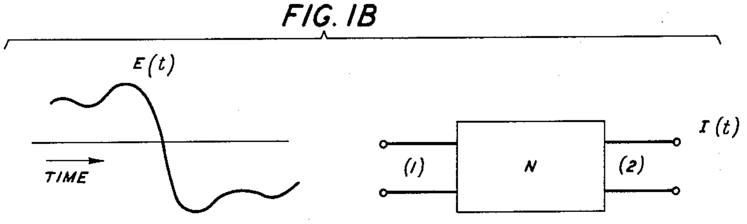
Figure 1C:
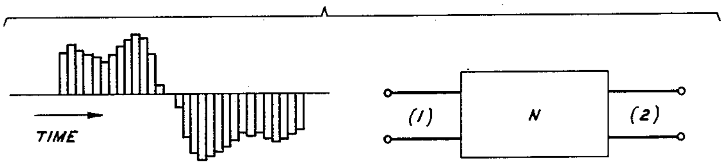

The broad principles upon which the time function point of view are based are illustrated in Figs. 1a to 1e to which reference is now made. Consider a frequency selective network such as is illustrated schematically by N in Fig. 1a. Let us assume that the complex voltage wave $E(t)$ shown in Fig. 1b which is any continuous function of voltage versus time is impressed upon the input 1 of the network. At the output 2 there will then appear a current wave which is designated as $I(t)$. Now let it be supposed that the voltage wave $E(t)$ is split up into a series of narrow pulses as shown in Fig. 1c. With this pulsed wave impressed upon the input terminals 1 one should expect to obtain at the output terminals 2 very nearly the same current wave $I(t)$ obtained before.

Figure 1D:
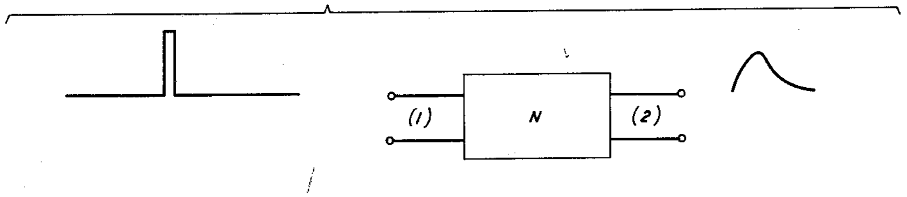
Figure 1E:
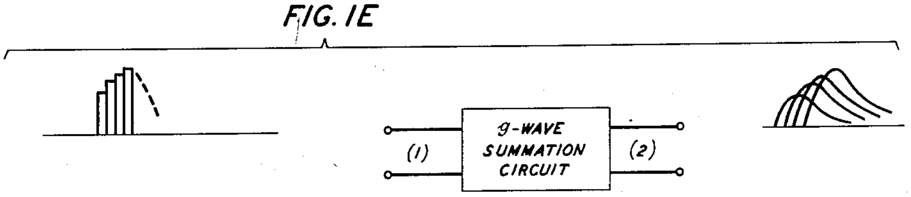

Now referring to Fig. 1d, assume that there is impressed upon the network a single pulse of the sort into which the voltage wave $E(t)$ has been subdivided. At the network output terminals 2 there now appears a function which as the pulse-width approaches zero is proportional to the $g$-function of the network as defined above. It should be noted that any other pulse of different amplitude would result in the same approximate $g$-function except that its amplitude would vary in proportion to the applied pulse magnitude and that moreover its time of occurrence would depend on the time of pulse application. Thus it follows as shown in Fig. 1e that in the limit the current wave $I(t)$ which appears at the output terminals 2 as a result of the application of the voltage wave $E(t)$ at the input terminals 1 is the sum of a number of overlapping $g$-functions whose relative strengths or amplitudes vary in accordance with the impressed voltage wave $E(t)$. Using a somewhat more precise language one can say that if the network is subjected at the input 1 to an initial pulse at some arbitrary time, which for convenience may be called zero, and if this pulse is followed by others at specified values of time, the total response at the output terminals 2 at any later time will be the sum of the responses which have occurred up to that time. Thus, two important principles applicable to this approach to network theory may be derived from the above. First, the network response to unit impulse of infinitesimal duration completely determines the response to any other input wave. Second, the response at any time depends upon the history of the applied input wave previous to the time in question, so that the past history must be available at least over a time interval within which the $g$-function is of appreciable magnitude.

Therefore, the network can be looked upon as a circuit for effecting the summation of a series of $g$-functions in which the individual amplitude of each of the respective $g$-functions is proportional to the corresponding time displaced instantaneous value of the impressed voltage wave E. This process is schematically indicated in Fig. 1e.

Adopting a slightly different point of view one can also look upon the output wave as representing at any time a weighted history or record of the input wave where the $g$-function has acted as the weighting factor.

The foregoing statements may be summarized by deriving a mathematical expression for the network response to an arbitrary driving force from the assumption that the net behavior of a linear system at any instant is a function of the linear superposition of all the responses which have occurred up to that time counting from some arbitrary starting point. Assume, for example, that a network is subjected to an initial voltage pulse $E(t)$ at the time $t=0$ and that this pulse is followed by others at specified values of time, then the total response at any later time will be the sum of the responses which have occurred up to that time, due allowance being made for the time at which each pulse was applied.

Let the time axis then be divided into short intervals $\Delta\tau$ of equal width, the electromotive force $E(t)$ being approximated by a series of rectangular pulses applied for the duration of each time interval $\Delta\tau$. The total response at a specified time $t$ is then approximately the sum at that instant of all the elementary responses started previous to that instant. If the interval $\Delta\tau$ is very small, that is, approaches zero as a limit, the response at time $t$ to the first impulse is $\Delta\tau E(0)g(t)$ where $g(t)$ is the response to unit impulse or $g$-function as defined hereinbefore, and where $E(0)$ is the amplitude of the voltage wave $E(t)$ at time $t=0$. Consider now the $(n+1)$th impulse. The response at the time $t$ is $E(n\Delta\tau)\Delta\tau g(t-n\Delta\tau)$. In this expression it should be noted that $n\Delta\tau$ is the time of impulse application. The reason that the argument of the $g$-function in this latter expression is $t-n\Delta\tau$ and not $t$ is that this pulse does not come into existence until the time $n\Delta\tau$ and the expression is only valid for time equal to or greater than $n\Delta\tau$. Assume an arbitrary point on the time scale to be denoted by $\tau$, thus $\tau=n\Delta\tau$. The current response $I(t)$ at the instant $t$ is the sum at time $t$ of all elementary responses that have occurred between time equal to 0 when the first impulse was started and time $t$ as the length of the time interval $\Delta\tau$ approaches zero. Hence $$I(t_o)=\lim_{\Delta\tau\to 0}\sum_{\tau=0}^{\tau=t}E(t)\Delta\tau g(t-\tau) \quad (1)$$

By definition of an integral this may also be written $$I(t)=\int_0^t E(\tau)g(t-\tau)d\tau \quad (2)$$

or $$I(t)=\int_0^t E(t-\tau)g(\tau)d\tau \quad (2')$$

This equation thus expresses the system response to an arbitarary driving force in terms of the response to a unit impulse of infinitesimal duration. Thus it follows that a knowledge of the response $g(t)$ to a unit impulse, that is, an applied pulse which in the limit approaches unit area and infinitesimal duration is sufficient to specify completely the system performance. This implies in particular that the steady state performance of a particular network may also be determined from a knowledge of $g(t)$ for that network. Suppose for example that the network is a filter passing a certain band of frequencies. This is then merely a reflection of the fact that $g(t)$ behaves in a very definite manner. To illustrate this in a general way, assume that a sinusoidal voltage $E(t)=E\sin\omega t$ where E represents the steady state amplitude and the angular frequency has been applied to the network at time $t=0$; and that all transients have died out. The steady state current can then be written as $$I(t)=E|Y_{12}(i\omega)|\sin[\omega t-\varphi(\omega)]= Ea_{12}(\omega)\sin\omega t+Eb_{12}(\omega)\cos\omega t \quad (3)$$

where $Y_{12}(i\omega)$ is the transfer admitance between input and output terminals of the selected network and $\varphi(\omega)$ its phase angle. By writing $$Y_{12}(i\omega)=a_{12}(\omega)+ib_{12}(\omega)$$

where $a_{12}$ and $b_{12}$ are constants the second of Expressions 3 is obtained. An equivalent expression may also be obtained from (2) or (2′), for by inserting $E(t)=E\sin\omega t$ and extending the range of integration to infinity (which means that transient distortion has died out) we get $$I(t)=E\sin\omega t\int_0^\infty \cos\omega t g(\tau)d\tau - E\cos\omega t\int_0^\infty \sin\omega\tau g(\tau)d\tau \quad (4)$$

By comparison of (3) and (4) it follows that $$a_{12}(\omega)=\int_0^\infty \cos\omega\tau g(\tau)d\tau$$

and (5)

$$b_{12}(\omega)=-\int_0^\infty \sin\omega\tau g(\tau)d\tau$$

The points to be emphasized in general are, first, that the Expressions 5 establish quantitative relations between the frequency selection properties of the network and the response to unit impulse excitation, and second, that both the real and imaginary components of the transfer admittance can be calculated from a knowledge of the response to unit impulse. This relationship may also be further illustrated as follows: Multiply the second of Equations 5 with $i$, the imaginary unit, and add to the first; then use Euler's formula. The result is $$Y_{12}(i\omega)=\int_0^\infty g(\tau)e^{-\omega\tau}d\tau \quad (6)$$

from which it follows that the steady state transfer admittance is the Fourier transform of the unit impulse response. From a principal point of view, it is thus irrelevant whether frequency selection properties of a network are stated in terms of steady state frequency response to sinusoidal driving forces or whether they are given as the time response to a unit impulse. The frequency response is merely the spectral analysis of the time response to a unit impulse. It also follows from (6) that $$g(t)=\frac{1}{\pi}\int_0^\infty |Y_{12}(i\omega)|\cos(\omega\tau+\theta(\omega))d\omega \quad (7)$$

where $Y_{12}(i\omega)$ denotes the amplitude and $\theta(\omega)$ the phase of the steady state transfer admittance. Equation 7 in principle allows $g(t)$ to be calculated from a knowledge of the frequency spectrum of the steady state transfer admittance, i. e., from the amplitude, and phase characteristics of the network. Moreover we have from (5)

$$g(t)=\frac{2}{\pi}\int_0^\infty a_{12}(\omega)\cos\omega t d\omega$$

and (8)

$$g(t)=-\frac{2}{\pi}\int_0^\infty b_{12}(\omega)\sin\omega t d\omega$$

Hence it follows that the time response $g(t)$ to unit impulse is completely determined when either the real or the imaginary component of the steady state transfer impedance is specified over the entire frequency range.

Stressing the physical interpretation of the facts presented rather than the mathematical analysis, three steps suggest themselves as a means by which an applied input function may be modified in accordance with certain admittance characteristics to produce a desired output response without resort to the conventional concepts of frequency selective networks. They are:

1. Recording or storage of the input wave;
2. Weighting of the stored record by means of a selected $g$-function; and
3. Summation of the weighted record.

These are fundamental steps which can serve as building blocks in frequency selective devices operating on a time function basis. It should be noted that in arriving at these steps no reference has been made to vibrating systems such as coil and condenser combinations nor has any use been made of the concepts of amplitude and phase versus frequency response. These concepts have now been replaced by the single concept of the $g$-function. In other words the physical phenomena conventionally described by the amplitude and phase versus frequency functions are now described by the single function $g(t)$.

As concrete examples of $g$-functions, consider two cases of functions in which the positive and negative values are symmetrical with respect to a certain value of time, say time $T_o$, where $T_o>0$. Consider first a low pass filter having a uniform transfer impedance equal to K from frequency zero to a cut off angular frequency $\omega_c$. Outside this range it is assumed that no transmission occurs. As a consequence of the stipulation of even time response, the phase shift $\theta(\omega)$ is linear and is given by the following equation:

$$\theta(\omega)=-\omega T_o+n.2\pi \quad (9)$$

For the low pass filter under consideration there is obtained a particular $g$-function, which will be designated $g_1(t)$, by substituting the above in Equation 7, which relates to the generalized function $g(t)$, and integrating the expression over a chosen range of angular frequencies from zero to $\omega_c$.

$$g_1(t)=\frac{1}{\pi}\int_0^{\omega_c}\cos\,(\omega t-\omega T_o)K d\omega$$

or (10)

$$g_1(t)=\frac{\omega_c K}{\pi}\,\frac{\sin\,[\omega_c(t-T_o)]}{\omega_c(t-T_o)}$$

Figure 2A:
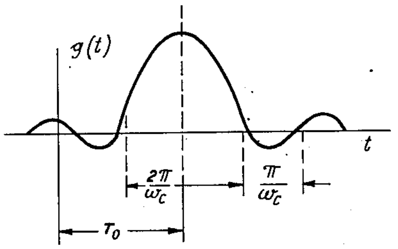
Figure 2B:
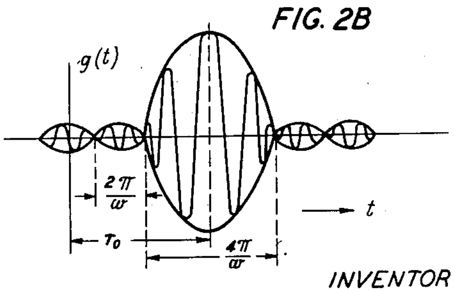

This function is shown as Fig. 2$a$. It may be demonstrated that the width of the main oscillatory lobe is inversely proportional to the band width $f_c$. It is also seen that the received signal reaches its maximum at the time $t=T_o$ and that the maximum response is proportional to the area $\omega_c$K under the amplitude characteristic.

As a second example we consider an idealized band pass filter of even time response and with a flat amplitude characteristic between the cut off frequencies $\omega_{c1}$ and $\omega_{c2}$ $(\omega_{c2}>\omega_{c1})$. Outside this frequency range it is assumed that no transmission can take place. From (7), substituting the conditions imposed by Equation 9, and integrating over the angular frequency range from $\omega_{c1}$ to $\omega_{c2}$, there is obtained a function which will be designated $g_2(t)$, which represents the particular case of the generalized $g$-function $g(t)$ as applied to an idealized band pass filter having the above characteristics.

$$g_2(t)=\frac{K}{\pi}\int_{\omega_{c1}}^{\omega_{c2}}\cos\,(\omega t-\omega T_o)d\omega$$

which may be reduced to $$g_2(t)=\frac{wK}{\pi}\,\frac{\sin\frac{w(t-T_o)}{2}}{\frac{w(t-T_o)}{2}}\,\cos\,\omega_m(t-T_o) \qquad (11)$$

Here $w$ represents the band width $\omega_{c2}-\omega_{c1}$ and $\omega_m$ the arithmetic mean of the two cut off frequencies $\omega_{c1}$ and $\omega_{c2}$ and may thus be considered to coincide with the mid-band frequency. Equation 11 which is roughly plotted on Fig. 2$b$ represents an amplitude modulated carrier wave with a carrier frequency equal to that of mid-band. The maximum response occurs at $t=T_o$ and is proportional to $w$K which is the area under the amplitude response characteristic and the length of the main oscillatory lobe is $$\frac{4\pi}{w}$$

which is inversely proportional to the band width.

Another factor which considerably influences the design of a transversal filter is the number of points at discrete intervals along a selected $g$-function curve which must be utilized in order to give a workable approximation of that function. Here one may be guided to some extent by a theorem due to L. A. MacColl, which states in effect that if the transfer admittance is large only in an interval A on the angular frequency axis, then the shortest interval on the time axis which contains all the points at which the value of $g(t)$ is large, is of length $$\frac{2\pi}{A}$$

or greater. It may be noted that special cases of MacColl's theorem are found in connection with the above discussion of the idealized $g$-functions of Figs. 2$a$ and 2$b$. The theorem is, however, so general that its practical use is limited.

As a concrete example consider the $g$-function $g_1(t)$ for the idealized low pass filter of Fig. 2$a$ and let it be assumed the three secondary lobes both to the right and left of the main lobe are taken into account. The time width of the $g$-function is then clearly $$\frac{2\pi}{\omega_c}+\frac{12\pi}{\omega_c}=7\cdot\frac{2\pi}{\omega_c}$$

where $\omega_c$ is the cut off frequency. Assume further that 10 equidistant ordinates are used for the time interval $$\frac{2\pi}{\omega_c}$$

The curve representing the entire $g$-function may thus be simulated by values corresponding to 70 points, selected at equally spaced intervals along the time axis.

The examples selected show that several important properties of the steady state characteristics can be obtained directly from an inspection of the plots of the $g$-functions. It must be emphasized, however, that too much significance cannot be attached to the calculated $g$-curves since they are based upon assumptions which cannot be fully realized. On the other hand, the general qualitative and quantitative properties of the $g$-functions for the filters in question are believed to have been preserved, although one is not justified in attaching very much significance to any of the finer details.

The computation of the $g$-function, as discussed hereinbefore, has necessarily been in broad general terms, with several specific applications by way of illustration. From the previous discussion, the procedure will be apparent to those skilled in the art for uniquely computing $g$-functions to comply with specific sets of conditions imposed in other particular cases than those discussed.

In accordance with the present invention, an electron space discharge device is constructed so as to perform the functions of continuously storing progressively different portions of an impressed input function, weighting the stored record in accordance with a desired $g$-function, and integrating the weighted increments of record to produce a modified output function. In the embodiments which will be presently disclosed, the electron discharge device comprises a glass envelope containing a semicylindrical cathode which surrounds and is vertically coextensive with a grid of smaller diameter, both being coaxially disposed about a central anode. The impressed input function is stored in the form of electromagnetic wave energy in the space between the cathode and the grid. Weighting of the stored record is brought about by space variations in the transconductance between certain of the input and output electrodes of the device, for example, the grid and the anode.

In the embodiment shown in Figs. 3$a$ and 3$b$ of the drawings, the transconductance is varied in accordance with the desired $g$-function by varying the spacings between successive vertical grid wires.

Referring to Fig. 3$a$, the electron space discharge device shown comprises the hermetically sealed glass envelope 301, extending inwardly from the base of which is the glass press 302. The anode 304, which comprises a metallic cylinder of small diametrical and vertical dimensions, is supported in a vertical axial position in the tube 301 by means of a rigid wire support 305 which is embedded in the glass press 302. The hollow semicyclindrical cathode 306, the inner surface of which is coated with a thermionic-emitting material such as barium or strontium oxide surrounds the anode 304 and is supported in a vertically coextensive coaxial position with respect thereto by the rigid supporting wires 307 embedded in the glass support 302. The cathode 306 is heated for electron emission by means of the heating coils 309 which are embedded in the ceramic coating 308 which covers its external surface. The heating coils 309 are connected by wires which pass through the glass press 303 and through hermetical seals in the envelope 301 to the external terminals 322 which are connected to a conventional energizing source not shown. Interposed between the cathode 306 and the anode 304 and supported in position by the rigid wires 314 is the semicylindrical grid 311, which is vertically coextensive with both the anode and the cathode, and circumferentially coextensive with the cathode. Assuming, for example, that the radial distance between the cathode 306 and the grid 311 is of the order of 10 mils, the corresponding distance between the grid 311 and the anode 304 is preferably of the order of 30 or 40 mils. It is also desirable that the vertical dimensions of the cathode 306 and the grid 311 shall be small relative to their circumferential dimensions.

Figure 3A:
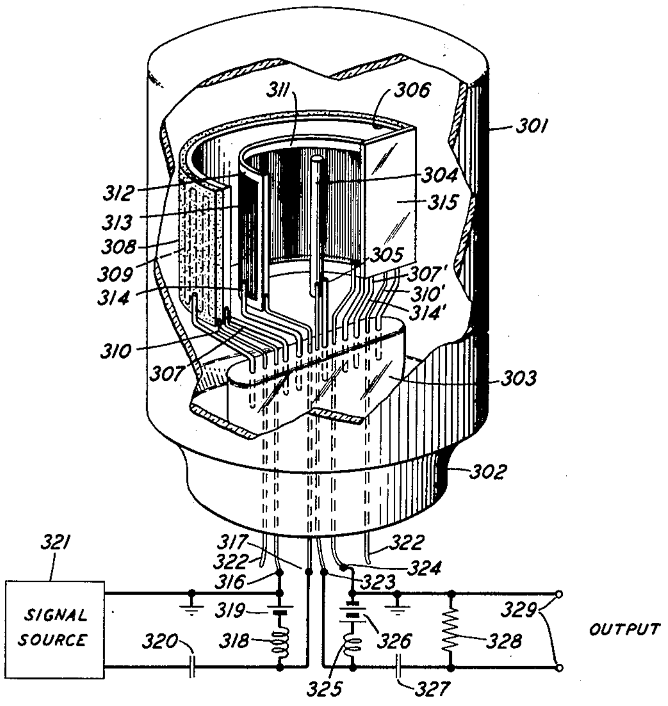
Fig. 3c shows an evolution of the variable pitch grid of Figs. 3a and 3b.
Figure 3B:
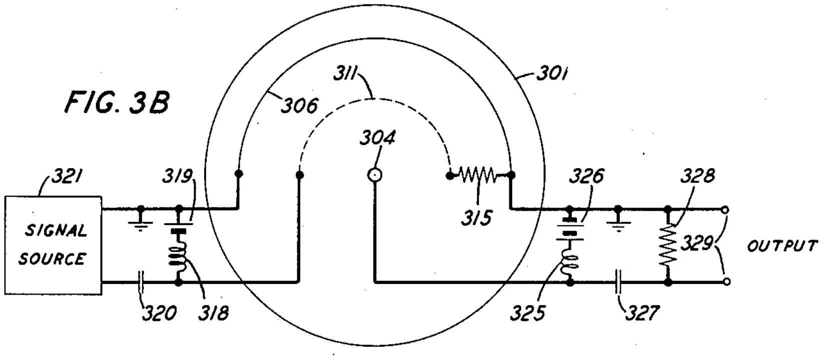
Figure 3C:
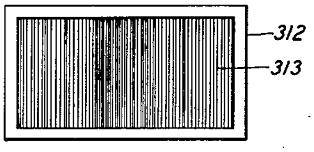

The grid 311, an evolution of which is shown in Fig. 3*c*, comprises a frame 312 of conducting material which is formed in a semicylindrical shape, to the upper and lower semicircular members of which are attached a plurality of vertical wires 313 having a cross-sectional dimension of the order of one mil, which are so spaced in relation to one another that the separating distances between successive wires cause a circumferential variation in the grid-to-anode transconductance in accordance with the chosen $g$-function which may be calculated as provided hereinbefore in accordance with a desired output response. A substantial similar effect on the grid-to-anode transconductance will be obtained by varying the cross-sectional dimensions of the individual grid wires instead of their respective spacings.

The storage space provided between the grid 311 and the cathode 306 for the input electromagnetic waves may be considered in the nature of an arcuate wave guide focussed about the anode 304, having a circumferential dimension which is large enough to accommodate a substantial approximation of the chosen $g$-function and the length of which will vary in accordance with the amplitude, frequency, and/or phase characteristics of the system as discussed hereinbefore. The arcuate space between the grid 311 and the cathode 306 terminates at the end remote from the input end in an impedance matching absorbing surface 315. The impedance matching termination 315 electrically connected between the grid 311 and the cathode 306, may take the form of a flat rectangular plate connected between the two surfaces, vertically coextensive therewith and normal thereto, the inner surface of which is coated with an electromagnetic wave absorbing material, such as, for example, bonded particles of carbon. Alternatively, the impedance matching element 315 may take the form of a network or a resistance connected between the cathode and grid externally of the envelope 301, as is shown in certain of the embodiments disclosed hereinafter.

The parts of the system connected externally of the envelope 301 comprise the input and output circuits. The external anode terminal 314 is connected to the anode 304 by a wire passing through a hermetical seal in the envelope 301 and embedded in the glass press 302, while the respective cathode terminals 315 and 316, and the grid terminal 317 are similarly connected respectively to the cathode 306 and the grid 311. The input circuit includes a source 321 of the alternating current input signal which is connected between the grounded cathode terminal 316 and in series with the condenser 320 to the grid terminal 317. The grid 311 is maintained at a negative potential of a few volts through a circuit including the bias battery 319 and the grid-leak resistance 318, also connected between the grounded cathode terminal 316 and the grid terminal 317. The output circuit includes the output resistance 328 and associated output terminals 329 which are connected between the grounded cathode output terminal 324 and in series with the condenser 337 to the anode output terminal 324. The anode is energized positively through a circuit which includes the power source 326 in series with the radio frequency choke 325, also connected between the terminals 324 and 323. The values of the positive direct current with time resulting from the pulse input anode 304 and of the negative biasing potential impressed on the grid 311 are preferably such that the relationship between the input signal and the output response is substantially linear.

Considering the operation of the system of Figs. 3*a* and 3*b*, assume that a pulse of infinitesimal duration from the source 321 is impressed across the terminals 316 and 317 of the tube 301. The pulse may be assumed to progress in a horizontal clockwise direction around the semicylindrical space between the cathode 306 and the grid 311, ultimately being absorbed by the impedance matching termination 315. In view of the variations in the spacings of the grid wires, the transconductance between the grid 311 and the anode 304 varies in accordance with the chosen $g$-function in the direction of travel of the pulse, so that, neglecting attenuation, a graphical representation of the change in output current with time resulting fro mthe pulse input would be a replica of the $g$-function. Assuming, now, that a complex signal is substituted for the single pulse at the input, which may be considered as divided into an infinite number of very short pulses in succession, each one of which produces a time variation in the output current which is a replica of the $g$-function. The total current output will accordingly be the summation of all of the increments of the complex signal multiplied by the impulse response function.

This operation may be expressed mathematically as follows. Assume that a signal E(t) is impressed across the input terminals 316—317, and that the signal traverses the arcuate storage space without attenuation, and is completely absorbed in the characteristic impedance termination 315, so that no reflections are produced. At any distance, say $s$, measured in terms of arc from the input end of the storage chamber between the cathode 306 and the grid 311, the instantaneous amplitude of the impressed signal may be expressed as $E(t-\tau)$, where $\tau$ represents the delay at a distance $s$ from the input end sustained by a wave while it travels through the chamber. Assuming that the specific $g$-function $g_1(t)$ as translated into variations of the spacings between successive grid wires has been adjusted by a constant factor to equalize any differences in wave-propagational velocities, the $g$-function value at an arcuate distance $s$ from the input end is equal to $g_1(\tau)\Delta\tau$. The increment of electron current reaching the anode 304 from a vertical slice of width $\Delta\tau$ at an angular distance $s$ along the cathode 306 is therefore proportional to $E(t-\tau)g_1(\tau)\Delta\tau$.

Summing up the increments of current reaching the anode 304 from each element along the entire length of cathode 306 at any time, the result is seen to be proportional to:

$$\sum I(t_0)=\sum E(t_0-\tau)g_1(\tau)\Delta\tau$$

The above equation is an approximation of the response integral derived in general terms as Equation 2' in the early part of the specification.

Figure 4A:
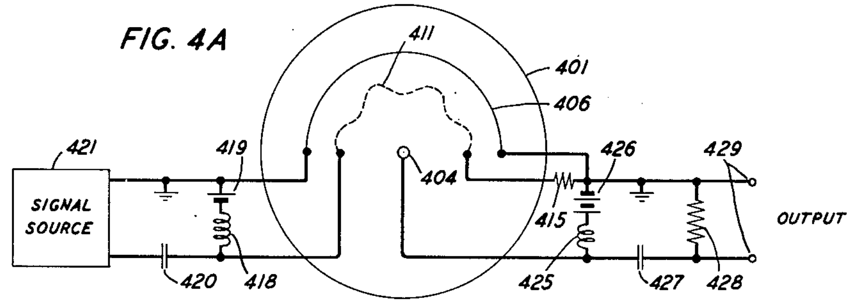
Fig. 4a shows a schematic view of a system in accordance with the present invention in which the spacing between the grid and the cathode is varied in accordance with the multiplying function.

In accordance with a second embodiment of the present invention shown in Fig. 4*a* of the drawings, variations in the transconductance between the grid and the anode are brought about by varying the radial distance between the grid and the cathode.

Fig. 4*a* represents a schematic showing of a system which is similar to the system shown in Figs. 3*a* and 3*b*, elements having corresponding numerical designations being similar in structure and function in the two systems, with the exception of the impedance matching resistance 415 which is connected externally of the envelope 401, and the grid 411, which differs from the grid 311 in the following respects. The grid 411 comprises a plurality of vertical parallel wires having cross-sectional dimensions of the order of one mil and a uniform pitch of the order of two and one-half mils, but so spaced from the cathode 406 that their respective radial distances therefrom vary inversely substantially in accordance with the square root of the chosen $g$-function $g_1(t)$, moving in a clockwise direction around the arcuate chamber between the cathode 406 and the grid 411. This variation in electrode spacing causes the transconductance between the grid 411 and the anode 404 for the respective signal-varied increments of electron current flowing from successive portions of the cathode 406 to the anode 404 to be respectively space modified in accordance with the chosen $g$-function, so that a modified output current is produced in the manner described with reference to the system of Fig. 3*a*. The mean interelectrode spacings in the system of Fig. 4*a* are substantially the same as those disclosed with reference to Fig. 3*a*.

Figures 4B, 5:
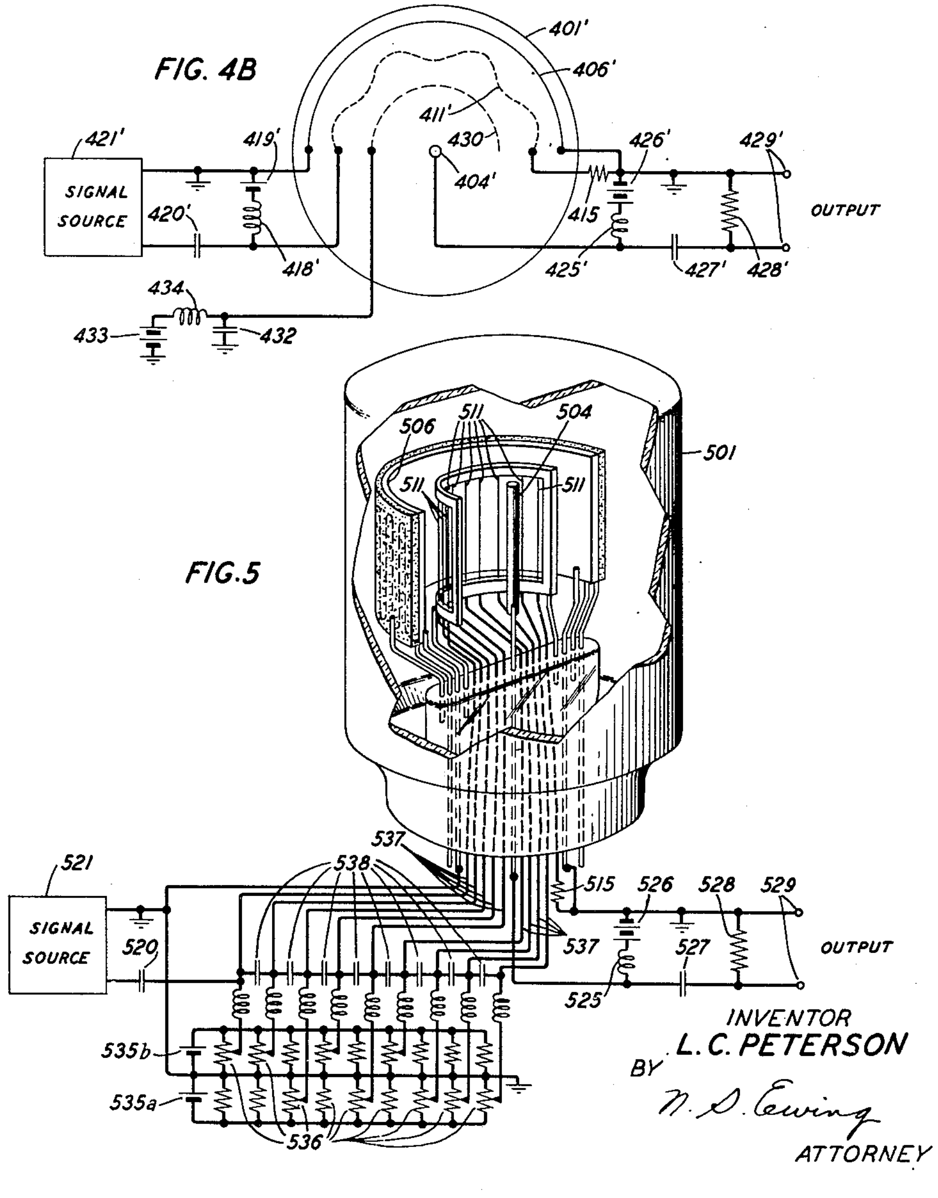
Fig. 4b shows a variation of the embodiment of Fig. 4a in which an additional grid is interposed in the discharge space.
Fig. 5 shows a perspective view of an embodiment in which individual grid wires are maintained at different potentials in accordance with a desired multiplying function.

The system represented schematically in Fig. 4*b* of the drawings is a modification of the system shown in Fig. 4*a*, in which an additional screen grid is interposed between the control grid and the anode to function as an electrostatic shield. The primed numerals represent elements which are substantially similar in structure and function to like numeraled elements of Fig. 4*a*.

In the system of Fig. 4*b*, the control grid 411' is substantially similar to the grid 411. The shielding screen 430 which is interposed between the grid 411' and the anode 404', is preferably so positioned that if the radial spacing between the cathode 406' and the control grid 411' is of the order of 10 mils, the corresponding spacing between the grid 411' and the screen 430 is of the order of 20 to 30 mils, and the spacing between the screen 430 and the anode 404' is of the order of 30 to 50 mils. The screen 430 is maintained at a high positive potential, within a few volts of the potential of the anode 404', by means of the potential source 433 operating through the radio frequency choke 434, a path to ground for alternating current signals being provided by the condenser 432.

The operation of the system of Fig. 4*b* is substantially the same as that of previously described systems in producing a modified output current. The shielding screen 430 operates to reduce distortion in the system by decreasing the feedback between output and input circuits.

In accordance with the embodiment of the invention disclosed in Fig. 5 of the drawings, variations in the grid-to-anode transconductance of the system are brought about by variations in the respective potentials of the individual grid wires. With the exception of the grid 511 and associated elements, the other elements in the system may be assumed to be substantially similar to correspondingly numbered elements in the systems described hereinbefore.

The grid 511 comprises a plurality of vertical parallel wires having a uniform pitch of the order of two and one-half mils, and each having a cross-sectional dimension of the order of one mil, attached to a cylindrical frame similar in shape to the frame 312 as disclosed in Fig. 3*c*, but comprising non-conducting material. In order to more clearly show the connecting circuits, the spacing between successive grid wires has been somewhat exaggerated in the showing of Fig. 5. The radial spacing between the cylindrical grid 511 and the cathode 506 is uniform, and of the order of 10 mils, while the corresponding spacing between the grid 511 and the anode 504 is of the order of 30 to 40 mils.

In order to produce a grid-to-anode transconductance which varies as the chosen $g$-function in a clockwise direction around the circumference of the grid 511, the potential of each individual vertical grid wire, as progressing in the aforesaid direction, is varied preferably as the square of the chosen $g$-function which may be computed as described in detail hereinbefore. Each of the grid wires 513 is connected to a respective one of the connecting wires 537 which are drawn through the glass press 512 at the base of the tube 501. Each of the respective wires 537 is connected to a slider disposed at the proper position on one of the plurality of potential dividers 536 which are connected in parallel across the positive and negative sources of potential **535*a* and 535*b*. The potential sources 535*a* and 535*b* are balanced with respect to ground so that each one of the grid wires 511** may be maintained at any desired potential, positive or negtaive up to the maximum provided by the respective sources.

In order to maintain the individual grid wires 513 at different direct current potentials, while permitting the alternating current impressed signal to flow from one to another with substantially low attenuation, the condenser elements 537 are interposed between each pair of the connecting wires 537 at the respective points where they enter the hermetically sealed glass envelope 501. The condenser elements 537 may comprise, for example, small squares of mica, which have been silvered on opposite faces. Operation of the system of Fig. 5 is substantially similar to operation of the systems of Figs. 3, 3*a* and *b* and 4, 4*a* and *b* described hereinbefore.

Many systems can be conceived within the scope of the present invention which have combinations of electrodes and other elements differing considerably in number and form from the components of the several illustrative embodiments disclosed herein. It will therefore be apparent to those skilled in the art that the scope of the present invention is not limited to any of the particular elements or combinations of elements disclosed.

What is claimed is:

1. A wave transducing system of the kind described comprising an electric space discharge device having cathode and anode electrodes with a grid electrode interposed between them, said grid electrode and one of the other of said electrodes being elongated and together forming an electric wave transmission line, a wave input connection at one end of said line and an impedance matching termination at the other end, said transmission line being curved and the second of said other electrodes being localized on the inner side of the curve, and the transconductance of said discharge device varying from one place to another along said line in conformity with a predetermined weighting function, and a wave output connection to said second electrode, whereby the wave output of said system at any instant is the integrated product of said weighting function and the variations in amplitude along said line of input waves present thereon at that instant.

2. A system in accordance with claim 1 in which said second electrode is localized at substantially the center of curvature of said line.

3. A system in accordance with claim 1 in which said second electrode is said anode.

4. A system in accordance with claim 1 in which said weighting function is the impulse response of said wave transducing system.

5. A system in accordance with claim 1 in which the separation of said grid electrode from one of said other electrodes varies from one place to another along said line.

6. A system in accordance with claim 1 in which said grid electrode comprises spaced conductive elements that vary in spacing from one place to another along said line.

7. A system in accordance with claim 1 in which said grid electrode comprises spaced elements insulated from each other, and biasing means to vary the operating potential of said elements from one place to another along said line.

8. A system comprising in combination a source of electromagnetic waves, an electron discharge device having a plurality of electrodes including a curvilinear cathode extended in one dimension, and an anode located substantially at the center of curvature of said cathode, an input circuit including said cathode and terminating in wave-absorbing means for propagating said waves in a curved path through the discharge space of said device transversely to the direction of electron flow therethrough whereby said cathode radiates electrons in a space pattern which varies in accordance with the space variations in said waves, means including a third one of said electrodes disposed between said anode and said cathode for further modifying said space pattern in the direction of the applied waves in accordance with selected values of a predetermined weighting function, and electrode means including said anode positioned to simultaneously collect and integrate said electrons at substantially the same point.

9. A wave translating system comprising a space discharge device having input electrodes and output electrodes, means including said electrodes for establishing a directed space discharge in said device, means including said input electrodes forming a curvilinear transmission line for conveying applied electrical waves through said device in a curved path transverse to the direction of said discharge at each point along said path whereby the strength of said discharge at any instant varies from point to point along said path in dependence on variations from point to point in the instantaneous amplitude of the waves in said transmission line, means connected to said line for preventing reflections of the input waves in said line, means comprising irregularities in one of the electrodes of said transmission line for varying the strength of said discharge concurrently from point to point in said first direction in conformity with a predetermined weighting function, and an electrode substantially centrally located with respect to each point in the direction of curvature of said transmission line for simultaneously collecting and integrating space discharge received from said points whereby the instantaneous value of the wave output of said device is dependent upon the integrated product of said weighting function and the variations in amplitude of the waves present on said line.

10. An electron space discharge device having a plurality of electrodes, a source of electrons, means including at least one of said electrodes for guiding applied waves in a curved path through a predetermined space interval transversely to the flow of electrons from said source, said guiding means having a terminating impedance for substantially preventing reflection of said guided waves, means including one of said electrodes for modifying the magnitude of said electron flow through said space interval in accordance with the variations in said waves, means including one of said electrodes for further modifying said electron discharge in accordance with a predetermined weighting function, and means including one of said electrodes located substantially at the center of curvature of said path for collecting and integrating said electrons.

LISS C. PETERSON.

REFERENCES CITED

The following references are of record in the file of this patent:

UNITED STATES PATENTS

| Number | Name | Date |
|---|---|---|
| 1,851,090 | Fetter | Mar. 29, 1932 |
| 1,925,105 | Morrison | Sept. 5, 1933 |
| 2,041,904 | Cone | May 26, 1936 |
| 2,122,538 | Potter | July 5, 1938 |
| 2,172,354 | Blumlein | Sept. 9, 1939 |
| 2,225,047 | Harnisch | Dec. 17, 1940 |
| 2,233,126 | Haeff | Feb. 25, 1941 |
| 2,289,756 | Clavier | July 14, 1942 |
| 2,345,115 | Hall | Mar. 28, 1944 |
| 2,403,561 | Smith | July 9, 1946 |

FOREIGN PATENTS

| Number | Country | Date |
|---|---|---|
| 113,181 | Australia | May 27, 1941 |